(No Model.)
W. C. JONES.
COFFEE POT.
No. 494,206. Patented Mar. 28, 1893.
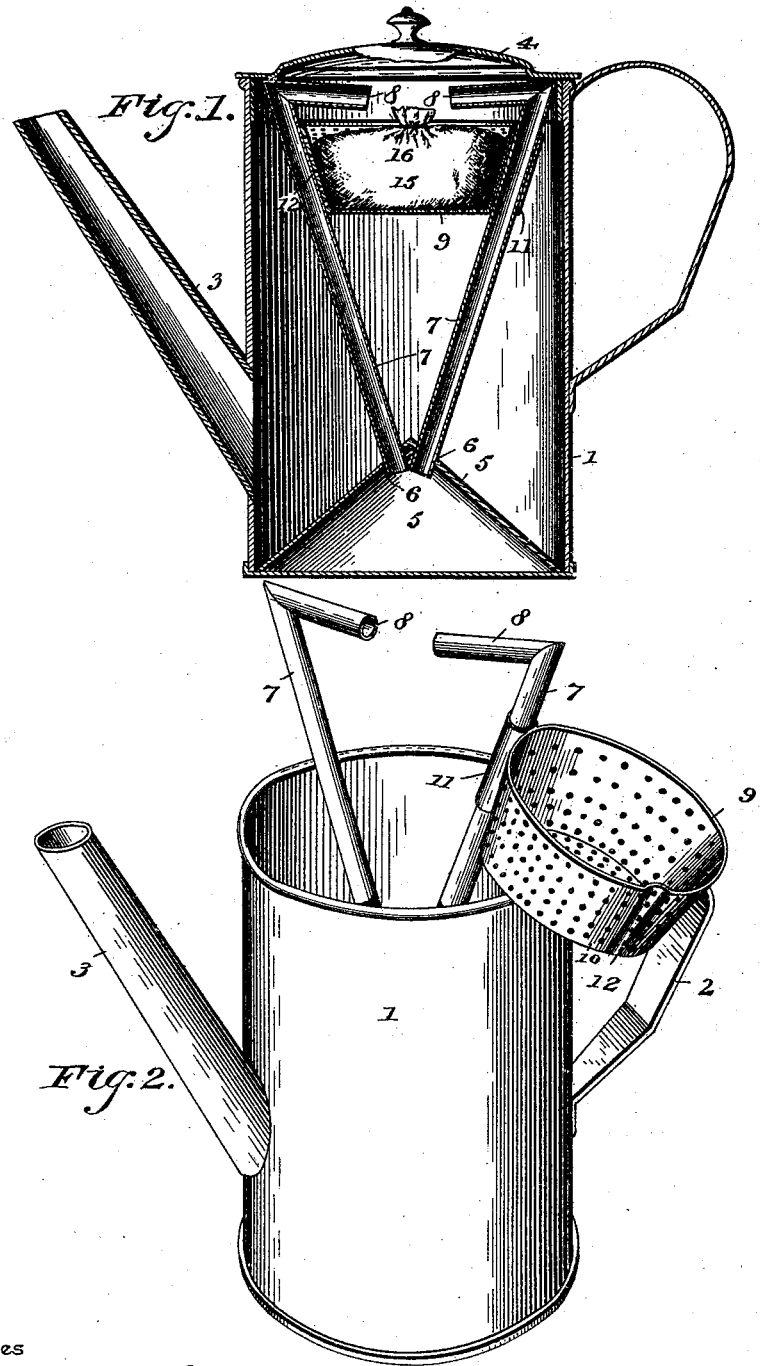
Witnesses
J. Ulke, Jr.
John H. Siggers.
Inventor
Wesley Corry Jones,
By his Attorneys,
C. A. Snow & Co.
THE NORRIS PETERS CO., PHOTO-LITHO., WASHINGTON, D. C.

UNITED STATES PATENT OFFICE.

WESLEY CORRY JONES, OF WARRENSBURG, MISSOURI.

COFFEE-POT.

SPECIFICATION forming part of Letters Patent No. 494,206, dated March 28, 1893.

Application filed December 21, 1892. Serial No. 455,917. (No model.)

*To all whom it may concern:*

Be it known that I, WESLEY CORRY JONES, a citizen of the United States, residing at Warrensburg, in the county of Johnson and State of Missouri, have invented a new and useful Coffee-Pot, of which the following is a specification.

My invention relates to improvements in that class of coffee pots employing internal circulating tubes located opposite each other and supporting an intermediate ground-coffee receiving strainer, the water from said tubes circulating through the same and percolating continuously through the body of ground-coffee contained in the strainer.

It is preferable in this class of inventions to employ a plurality of strainers, in that the coffee is improved, or the strength of the grounds extracted in less time than where but a single circulating-tube is employed. An objection, however to all pots of this character is the extreme difficulty and annoyance occasioned by the constantly required cleaning of the strainer, that is, to free its perforations of the coffee-grounds that work therein and impede or obstruct the passage of water therethrough.

The objects of my invention are to avoid the necessity of having to clean constantly the strainer; to provide for a ready insertion of the ground-coffee bodily into the strainer notwithstanding the presence of the plurality of tubes; and furthermore, to provide for successively charging and recharging the strainer with coffee as the strength of the same is extracted.

With these objects in view the invention consists in certain features of construction hereinafter specified and particularly pointed out in the claims.

Referring to the drawings:—Figure 1 is a sectional view of a coffee-pot constructed in accordance with my invention, the parts being in operative position. Fig. 2 is a perspective view, the strainer being swung to one side to receive the charge of coffee.

Like numerals of reference indicate like parts in both the figures of the drawings.

1 designates an ordinary cylindrical coffee-pot provided with the usual handle 2, the spout 3, and the removable cover 4.

5 designates a conical circular base of a diameter agreeing with that of the coffee-pot, and adapted to be seated upon the bottom of the pot or to be drawn upward in the manner hereinafter specified, and maintain its position at any elevation within the pot by contact of its edge with the surrounding wall of the pot. The base is provided at the sides of its apex, in this instance, with a pair of perforations 6, and through the same are passed the lower ends of a pair of upwardly diverging circulating pipes or tubes 7, which extend upwardly within the pot to a point near its upper end and are provided with inwardly-disposed branches 8 in line with each other.

9 designates a foraminous or perforated strainer, and the same is provided with a surrounding flared wall 10, of a diameter adapting it to fit snugly between the diverging circulating tubes near their upper ends. The wall is provided at one side with a sleeve 11, which is rigidly secured thereto and swiveled loosely on one of the tubes, whereby, as will be apparent, the strainer is hinged to the tube and may be swung outwardly away from the same, or out of vertical alignment with the inwardly disposed branches or tubes. The flared wall 10 of the strainer, at a point diametrically opposite the sleeve, is provided with an indentation or bend 12, whereby when the strainer is swung inward or under the branches of the tubes the said indentation will be sprung over that tube adjacent thereto and thereby locked in position between the tubes.

15 designates a bag, made of textile material, such as muslin, cotton, &c., and the same is provided near its mouth with a draw-string 16, by which the latter may be closed.

In operation the bag is filled wholly or partially with a charge of coffee, and the base 5 of the attachment through the medium of the tubes is drawn up partially out of the pot, so that the strainer is above the upper edge of the pot. The strainer is then disconnected from one of the tubes, swung to one side so as to receive the charge of coffee bodily, and this is permitted by reason of the fact that when thus swung to one side the branch pipes do not interfere with the insertion of the bag into the strainer. When the bag has been inserted, the strainer is swung inward so as to become locked in position between the two tubes, and the attachment is forced down into the coffee-pot and the body of water contained therein. The hot water will, as will be understood, flow upward through the tubes out of the branches and be emitted upon the body of coffee contained within the bag, and will percolate through the same and down through the perforations in the strainer to be again taken up and recirculated, such circulation being continued as long as the water is hot, so that the entire strength of the coffee is thoroughly and quickly extracted. After the contents have been partially exhausted and it is desired to renew the coffee, or make fresh coffee, this can be readily accomplished by a partial removal of the attachment, a swinging of the same to one side, a bodily removal of the bag containing the coffee, and the substitution of another bag thus filled or the same bag refilled. It will be seen that in this manner no coffee grounds can possibly get into and clog the perforations of the strainer so that the passage or percolation of the water through the grounds and the strainer is uninterrupted; and furthermore, that no frequent cleaning of the strainer and a freeing of its holes of the grounds is necessary.

Having described my invention, what I claim is—

1. The combination with a coffee pot, of a hollow base removably located therein, a pair of tubes rising from the base and terminating at their upper ends in inwardly-disposed branches, a perforated strainer having a flared wall located between the tubes near their upper ends, said wall being provided at one side with an indentation for engaging over one of the tubes, and a sleeve at the opposite side loosely engaging the opposite tube, substantially as specified.

2. The combination with a cylindrical coffee pot, of a conical base which is circular and adapted to fit snugly within the coffee pot and to have frictional contact therewith whereby it may be supported at any point of elevation, diverging tubes extending from the base and through the same and to points near the upper end of the pot and provided with inwardly-disposed branches, and a perforated strainer adapted to interlock with one of the tubes and loosely hung and adapted to swing upon the remaining tube, substantially as specified.

In testimony that I claim the foregoing as my own I have hereto affixed my signature in the presence of two witnesses.

WESLEY CORRY JONES.

Witnesses:
HENRY P. RENICK,
W. H. H. COLLINS.